Nov. 9, 1926.　　　　　　　　　　　　　　　　　　　　1,606,392
C. N. ALLERDING
STEERING WHEEL
Filed April 5, 1926　　　　　　2 Sheets-Sheet 1

INVENTOR.
CLETUS N. ALLERDING
BY
Rex Frye
ATTORNEY.

Nov. 9, 1926.
C. N. ALLERDING
1,606,392
STEERING WHEEL
Filed April 5, 1926      2 Sheets-Sheet 2
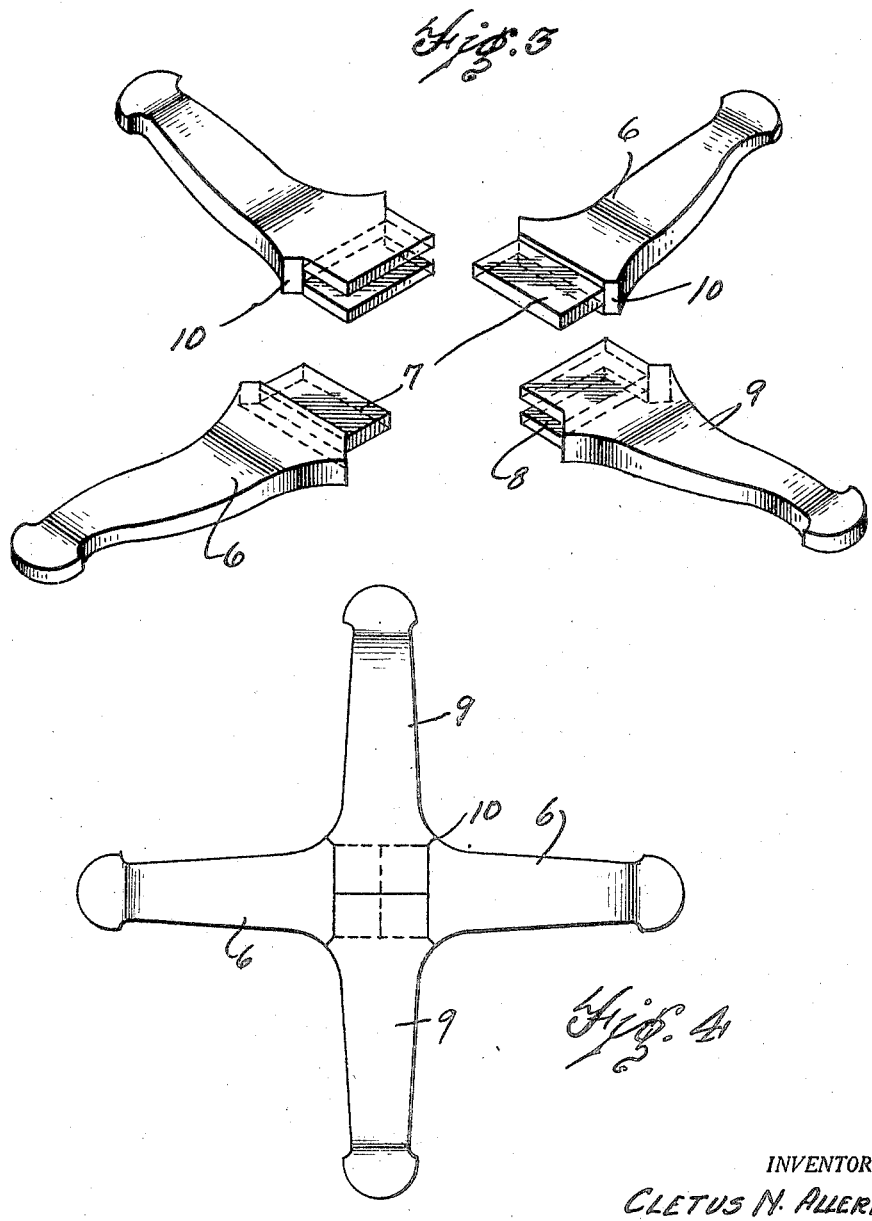
INVENTOR.
CLETUS N. ALLERDING
BY
ATTORNEY.

Patented Nov. 9, 1926.

1,606,392

UNITED STATES PATENT OFFICE.

CLETUS N. ALLERDING, OF MANSFIELD, OHIO.

STEERING WHEEL.

Application filed April 5, 1926. Serial No. 99,750.

This invention relates to steering wheels and particularly to steering wheels adapted for use on automobiles, motor boats, aeroplanes and the like.

The primary object of my invention is the provision of an all-wood steering wheel that combines the beauty, strength and usefulness of all-wood steering wheels now on the market with a simplicity of construction and assembly that will materially reduce the cost of manufacturing all-wood steering wheels. Wooden steering wheels have rapidly grown in favor among the drivers of automobiles, etc. during the last few years because of their superior lightness, attractiveness of appearance and greater comfort to the user during cold weather. However, the wooden steering wheels in general use are comparatively expensive to manufacture, and their cost has restricted their use to the higher grades of automobiles, etc. The present invention aims at a reduction in the cost of manufacturing wooden steering wheels without sacrificing their advantages.

A further object of my invention is the provision of a wooden spider for steering wheels composed of two sets of spokes arranged in alignment with each other, one set being provided with tongues and the other set being provided with grooved portions adapted to overlie and underlie the tongued portions of the other set of spokes, whereby the hub portions of all the spokes mutually brace each other without unduly thickening the hub portion of the spider.

Other objects and advantages will be apparent from the following description, wherein reference is made to the accompanying drawings illustrating a preferred embodiment of my invention and wherein similar reference numerals designate similar parts throughout the several views.

In the drawings:

Fig. 3 is a composite perspective view showing the several spokes of my steering wheel in position to be assembled, and Fig. 4 is a plan view showing the positions assumed by the several spokes, when assembled.

Figure 1:
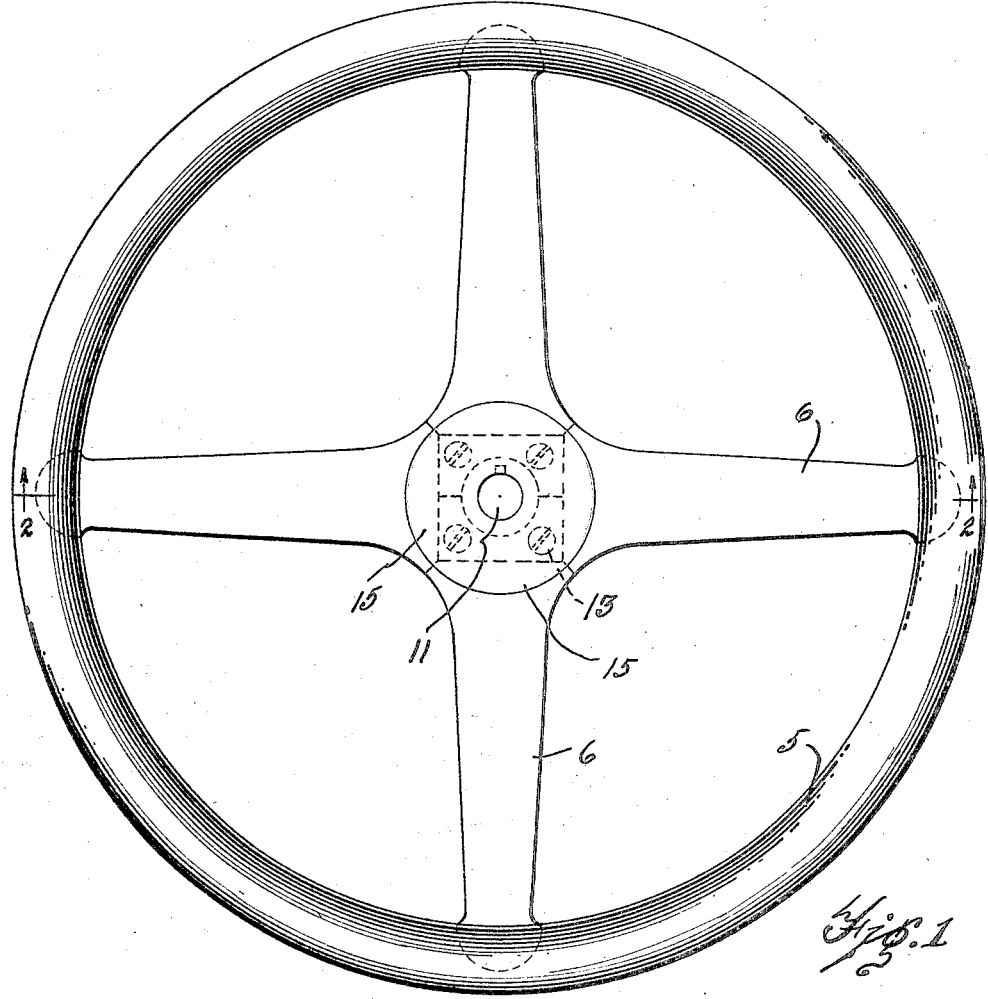
Fig. 1 is a plan view of my improved steering wheel.
Figure 2:
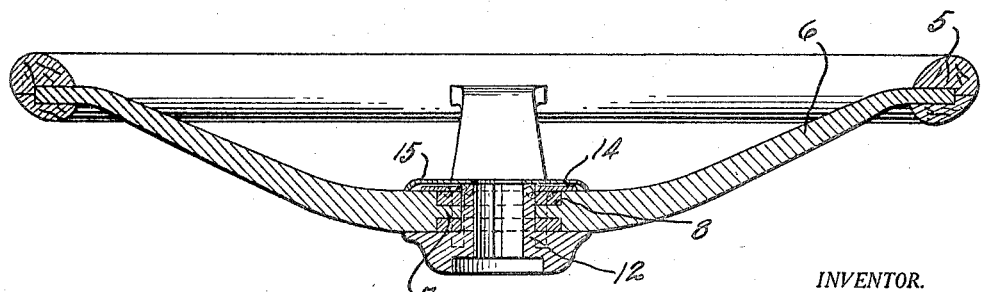
Fig. 2 is a cross section taken substantially on the line 2—2 of Fig. 1.

Referring now to the drawings, the numeral 5 designates a rim, preferably formed of wood in any desired manner, as by providing upper and lower laminations, either or both of which are notched at intervals to receive the outer extremities of the spokes. The spokes are preferably of wood extending radially of the steering wheel with their outer extremities suitably secured within the notched portions of the rim 5, substantially as shown in Figs. 1 and 2. The spokes are arranged in pairs aligning with each other and have their inner extremities abutting, one pair of spokes, as 6, being formed with tongued portions 7 at their inner extremities, substantially as shown in Fig. 3. The tongued portions are preferably integrally formed with the body portions of the spokes 6 and are located substantially centrally of the thickness of the spokes, as by cutting away from the inner extremities of the spokes 6 portions adjacent their top and bottom. The amount of material thus cut away is substantially equal in thickness to each of the spaced upper and lower walls of the grooved portions 8 of the companion set of spokes 9 (note Fig. 3) whereby when the spokes are assembled the combined thickness of the tongues 7 and the wall portions 8 of the spokes 9 are substantially equal to the thickness of the body portions of the spokes adjacent the tongue and grooved members. The inner extremities of each of the companion set of spokes are formed with a horizontal groove of substantially the thickness of the tongues 7 of the first mentioned set of spokes, such groove being positioned substantially centrally of the depth of the spoke. Each groove extends outwardly from the inner extremity of the spoke for a distance substantially equal to one-half of the width of the tongues 7 of the first mentioned set of spokes, whereby when the grooved spokes fit over the tongues 7 of the tongued spokes with their inner extremities abutting, the tongues will substantially fill the grooves of the grooved spokes, substantially as shown in Fig. 4. The hub portions of each spoke are also provided with inclined lateral extensions 10 (note Fig. 3) adjacent the extremities of the tongues 7 and grooved portions 8 of the respective spokes, and such inclined faces 10 are preferably arranged so as to extend substantially radially of the steering wheel. The radially disposed faces 10 of the lateral extensions extend the full thickness of the hub portions of the spokes and provide abutments for adjacent spokes, serving to relieve the tongued and grooved portions of the spokes from twisting strains and giving to the assembled spider a finished appearance. Suitable apertures 11 are cut through the overlapping tongued and grooved portions of the assembled spokes for the reception of flanged sleeves 12 or the like whereby the steering wheel may be secured to a steering shaft, screws 13 or similar fastening means being employed to bind an upper plate 14 to the flanged sleeve 12, substantially as shown in Fig. 2. If desired, a cover plate 15 may also be employed to hide the top plate 14 and the securing elements from view.

In practice, I preliminarily form the spokes 6 and 9 with any desired configuration, as for example with the taper shown in Figs. 2 and 3. Then when it is desired to assemble a complete steering wheel, the prepared spokes are treated with glue on the faces of the tongued portions and on the inclined faces 10 of the lateral abutments, whereupon the two spokes are positioned with the inner extremities of their tongues abutting, and then the spokes 9 are laterally moved over the tongued portions of the spokes 6 until the inner extremities of the grooved portions 8 of the spokes 9 abut each other. The assembled spokes are then clamped in position until the glue has set. The outer extremities of the spokes 6 and 9 may be positioned within the rim sections at the same time as the hub portions of the spokes are glued to each other and a single clamping operation serves to secure together the hub portions of the spokes and their outer extremities within the rim. Or, if desired, the wheel spiders may be separately formed and later secured within the rims in any desired manner.

The simplicity of construction of my improved steering wheel is believed to be apparent. The spokes can be formed in large quantities entirely by machinery and from comparatively short pieces of stock, and can be assembled rapidly to form complete spiders by laborers without previous experience in woodworking. Moreover, the interfitting hub portions of the spokes carry only a small portion of the strains imposed on a steering wheel, the abutting radially disposed portions 10 serving to relieve the cut away portions from most of the twisting strains. The entire wheel may be assembled without metal parts if desired, or screws or the like may be utilized to aid in securing the spoke extremities to the rim or the overlapping hub portions to each other.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. A steering wheel composed of a rim and interfitting tongued and grooved spokes, the grooved portions of each grooved spoke being arranged at substantially right angles to and extending over substantially half of the tongued portions of the tongued spokes.

2. A steering wheel composed of a rim and two pairs of aligned spokes arranged at substantially right angles to each other, one pair of spokes being provided with tongues and the other set of spokes being provided with grooved portions abutting each other at their inner extremities and each extending over substantially half of both of the tongued spokes.

3. An all-wood steering wheel composed of a rim and two pairs of aligned spokes, one pair of spokes being provided with tongues abutting each other at their inner extremities and the other set of spokes being provided with grooved portions arranged at substantially right angles to the tongued portions of the spokes, said grooved portions overlying and underlying the tongued portions of the other spokes and abutting each other at their inner extremities.

In witness whereof I hereunto set my hand.

CLETUS N. ALLERDING.